United States Patent … US 10,450,013 B2
Cha et al. … Oct. 22, 2019

(54) VEHICULAR SPOILER SYSTEM TO ADJUST AIRFLOW BASED ON ENVIRONMENTAL FACTOR

(71) Applicants: Hyundai Motor Company, Seoul (KR); Kia Motors Corporation, Seoul (KR)

(72) Inventors: Dong Eun Cha, Seongnam-Si (KR); Jin Young Yoon, Gimpo-si (KR); Hyun Gyung Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 75 days.

(21) Appl. No.: 15/822,552

(22) Filed: Nov. 27, 2017

(65) Prior Publication Data

US 2019/0002039 A1    Jan. 3, 2019

(30) Foreign Application Priority Data

Jun. 30, 2017   (KR) .......................... 10-2017-0083183

(51) Int. Cl.
 *B62D 35/02*  (2006.01)
 *B62D 35/00*  (2006.01)
 (Continued)

(52) U.S. Cl.
 CPC ........... *B62D 35/02* (2013.01); *B62D 35/005* (2013.01); *B62D 35/007* (2013.01); *B62D 37/02* (2013.01);
 (Continued)

(58) Field of Classification Search
 CPC .... B62D 35/02; B62D 35/007; B62D 35/005; B62D 37/02; G01S 19/42; G01S 13/931;
 (Continued)

(56) References Cited

U.S. PATENT DOCUMENTS

| | | | | |
|---|---|---|---|---|
| 4,810,022 A | * | 3/1989 | Takagi | B62D 35/005 296/180.5 |
| 2007/0257512 A1 | * | 11/2007 | Anderson | B62D 35/00 296/180.1 |

(Continued)

FOREIGN PATENT DOCUMENTS

| | | | |
|---|---|---|---|
| FR | 3014403 A1 | * | 6/2015 |
| JP | 2005-212719 | * | 8/2005 |
| KR | 10-1507948 | | 4/2015 |

*Primary Examiner* — Michael J Zanelli
(74) *Attorney, Agent, or Firm* — Morgan, Lewis & Bockius LLP (57) ABSTRACT

A vehicular spoiler system that adjusts airflow based on environmental factors, may include a spoiler device disposed to a vehicle to vertically pivotably rotate to be deployed or retracted, the spoiler device controlling an airflow when the spoiler device is deployed under predetermined operation conditions; and a controller configured to receive environmental information regarding a surrounding environment and to pre-store information regarding control of the spoiler device based on the environmental information, the controller performing control to deploy or retract the spoiler device based on local information when the local information, among the environmental information, is input.

16 Claims, 4 Drawing Sheets

(51) Int. Cl.
*B62D 37/02* (2006.01)
*G01S 19/42* (2010.01)
*G01S 13/93* (2006.01)
*G01S 13/95* (2006.01)
*G01S 15/88* (2006.01)
*G01S 15/93* (2006.01)
*G08G 1/16* (2006.01)
*G01S 19/13* (2010.01)

(52) U.S. Cl.
CPC ............ *G01S 19/42* (2013.01); *G01S 13/931* (2013.01); *G01S 13/95* (2013.01); *G01S 15/885* (2013.01); *G01S 15/931* (2013.01); *G01S 19/13* (2013.01); *G08G 1/165* (2013.01); *G08G 1/166* (2013.01)

(58) Field of Classification Search
CPC ...... G01S 13/95; G01S 15/931; G01S 15/885; G08G 1/166; G08G 1/165
See application file for complete search history.

(56) References Cited

U.S. PATENT DOCUMENTS

| | | | |
|---|---|---|---|
| 2014/0265169 A1* | 9/2014 | Giovanardi | F15B 13/0444 280/5.5 |
| 2015/0046084 A1* | 2/2015 | Choi | G01C 21/3697 701/468 |
| 2017/0151984 A1* | 6/2017 | Bray | B62D 35/007 |
| 2018/0022404 A1* | 1/2018 | Fahland | B60W 40/02 701/49 |
| 2018/0154952 A1* | 6/2018 | Klop | B62D 35/005 |

* cited by examiner

FIG. 4

VEHICULAR SPOILER SYSTEM TO ADJUST AIRFLOW BASED ON ENVIRONMENTAL FACTOR

CROSS-REFERENCE(S) TO RELATED APPLICATION

The present application claims priority to Korean Patent Application No. 10-2017-0083183, filed on Jun. 30, 2017, the entire contents of which is incorporated herein for all purposes by this reference.

BACKGROUND OF THE INVENTION

Field of the Invention

The present invention relates to a vehicular spoiler system, which adjusts airflow based on environmental factors, and more particularly, to a vehicular spoiler system, which determines whether to deploy or retract a spoiler based on changes in a plurality of environmental factors, ensuring stable operation of the spoiler.

Description of Related Art

Upon high-speed traveling or turning of a vehicle, a grip force of a rear wheel tire may be reduced, which is disadvantageous when accelerating and deteriorates a traveling stability.

To solve the provided problem, an air spoiler is disposed on a rear of the vehicle to change an air flow that moves around the vehicle. A downforce that presses down the vehicle is generated by airflow around the air spoiler, which results in an increase in the grip force of the rear wheel tire.

Meanwhile, when the air amount introduced to the underside of a front bumper is increased upon high-speed traveling of the vehicle, the vehicle rises up, which causes a reduced tire grip force and deteriorates traveling stability.

To solve the above problem, an air skirt is disposed on the lower end portion of the front bumper to reduce the air amount introduced to the underside of the vehicle, which causes a reduction in drag and lift forces, contributing to an increase in tire grip force.

Meanwhile, to control the airflow using the air spoiler and the air skirt described above, and to further increase traveling stability using the airflow, a rear bumper spoiler may further be provided to increase an aerodynamic performance. The rear bumper spoiler is provided on a rear bumper of the vehicle to control the air flow introduced to the underside of the vehicle, minimizing the generation of eddies at the tail of the vehicle.

As described above, the air spoiler, the air skirt and the rear bumper spoiler may be disposed to the vehicle to control the airflow. Conventionally, airflow control devices have been configured to continuously remain in the outwardly deployed state, or have performed control based on a traveling speed, but have not considered surrounding obstacles or changes in the weather.

Due to the above problem, the spoiler may be damaged due to collision with obstacles, and may block airflow when strong wind blows, causing deterioration in traveling stability.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Therefore, the present invention has been made in view of the above problems, and is directed to determine whether to deploy or retract a spoiler based on changes in a plurality of environmental factors including local information, a presence or absence of obstacles, and weather information. Various aspects of the present invention are directed to providing a vehicular spoiler system, which secures the durability of a spoiler by preventing the spoiler from being damaged by obstacles, and performs a control of airflow in an optimal situation based on environmental factors including the weather.

In accordance with an aspect of the present invention, the above and other objects can be accomplished by the provision of a vehicular spoiler system that adjusts an airflow based on environmental factors, the system including a spoiler device disposed to a vehicle to vertically pivotably rotate to be deployed or retracted, the spoiler device controlling airflow when the spoiler device is deployed under predetermined operation conditions, and a controller configured to receive environmental information regarding a surrounding environment and to pre-store information regarding the control of the spoiler device based on the environmental information, the controller configured to perform control to deploy or retract the spoiler device based on local information when the local information, among the environmental information, is input.

The spoiler device may include one or more air skirts disposed to a front lower portion of the vehicle to be vertically deployed or retracted, a rear bumper spoiler disposed to a rear lower portion of the vehicle to be vertically deployed or retracted, and a rear air spoiler disposed to a rear of the vehicle to be vertically deployed or retracted, and the air skirt, the rear bumper spoiler and the rear air spoiler may be individually or simultaneously operated.

The controller may be configured to determine whether an obstacle is present on a road surface upon receiving the local information, and when it is determined that the obstacle is present on the road surface, the controller may perform control to deploy or retract the spoiler device to prevent the spoiler device from interfering with the obstacle.

The controller may be configured to collect the local information by receiving a GPS signal from a global positioning system (GPS) receiver, and may perform control to retract the air skirt and the rear bumper spoiler when it is determined that the vehicle is about to encounter a speed bump or is entering an inclined road.

The controller may be configured to collect the local information from a detecting device, which detects an obstacle around the vehicle, and may perform control to retract the air skirt and the rear bumper spoiler when the detecting device inputs a signal indicating that the obstacle is present on the road surface in front of the vehicle.

The detecting device may determine the presence or absence of the obstacle and a height of the obstacle, and the controller may be configured to collect information regarding the height of the obstacle from the detecting device, and may perform control to retract the air skirt and the rear bumper spoiler when the height of the obstacle is a predetermined height or greater.

The controller may be configured to collect vehicle speed information from a speed detector, and may allow the air skirt and the rear bumper spoiler to be deployed or retracted by a driver's command when the vehicle speed is within a predetermined low-speed range in the state in which the obstacle is detected by the detecting device.

The controller may be configured to receive local information regarding a speed limit of a current road based on GPS signals, and when it is determined that the speed limit of the current road is within a high-speed range, the controller may perform control to operate the spoiler device under predetermined operation conditions.

The controller may be configured to perform control to retract the spoiler device and to allow the air skirt, the rear bumper spoiler and the rear air spoiler to be deployed by the driver's command when it is determined that the speed limit of the current road is within a low-speed range.

In accordance with another aspect of the present invention, there is provided a vehicular spoiler system that adjusts airflow based on environmental factors, the system including a spoiler device disposed to a vehicle to vertically pivotably rotate to be deployed or retracted, the spoiler device controlling airflow when the spoiler device is deployed under predetermined operation conditions, and a controller configured to receive environmental information regarding a surrounding environment and to pre-store information regarding the control of the spoiler device based on the environmental information, the controller performing control to deploy or retract the spoiler device based on weather information regarding a weather condition when the weather information, among the environmental information, is input.

The spoiler device may include one or more air skirts disposed to a front lower portion of the vehicle to be vertically deployed or retracted, a rear bumper spoiler disposed to a rear lower portion of the vehicle to be vertically deployed or retracted, and a rear air spoiler disposed to a rear of the vehicle to be vertically deployed or retracted, and the air skirt, the rear bumper spoiler and the rear air spoiler may be individually or simultaneously operated.

The controller may be configured to collect wind speed information by receiving the weather information from a weather information collector, and may perform control to retract the spoiler device when a wind speed is a reference wind speed or greater.

The controller may be configured to perform control to operate the spoiler device under predetermined operation conditions when the wind speed is less than the reference wind speed.

The controller may be configured to collect vehicle speed information from a speed detector, and may perform control to deploy only the air skirt when a vehicle speed is a predetermined speed or greater and the wind speed is within a predetermined wind speed range.

The controller may be configured to collect information regarding the amount of snowfall by receiving the weather information from a weather information collector, and may perform control to retract the spoiler device when the amount of snowfall is a reference amount of snowfall or greater.

The controller may be configured to perform control to operate the spoiler device under predetermined operation conditions when the amount of snowfall is less than the reference amount of snowfall.

The controller may be configured to determine a range of the amount of snowfall less than the reference amount of snowfall to a general snowfall range which corresponds to a small amount of snowfall, and a heavy snowfall warning range which corresponds to a larger amount of snowfall than the general snowfall range, and the controller may perform control to operate the spoiler device under predetermined operation conditions when the amount of snowfall is within the general snowfall range.

The controller may be configured to perform control to retract only the rear air spoiler when the amount of snowfall is within the heavy snowfall range less than the reference amount of snowfall.

The controller may be configured to collect information regarding the amount of rainfall from a rain detector, and may perform control to retract the spoiler device when the amount of rainfall is a reference amount of rainfall or greater.

The controller may be configured to perform control to operate the spoiler device under predetermined operation conditions when the amount of rainfall is less than the reference amount of rainfall.

The controller may be configured to determine a range of the amount of rainfall greater than the reference amount of rainfall to a medium rainfall range and a strong rainfall range, which corresponds to a larger amount of rainfall than the medium rainfall range, and the controller may collect vehicle speed information from a speed detector, and may perform control to deploy only the rear air spoiler when a vehicle speed is within a predetermined speed range in a state in which the amount of rainfall is within the medium rainfall range.

The controller may be configured to perform control to retract the spoiler device when the amount of rainfall is within the strong rainfall range.

In accordance with a further aspect of the present invention, there is provided a vehicular spoiler system that adjusts airflow based on environmental factors, the system including a spoiler device disposed to a vehicle to vertically pivotably rotate to be deployed or retracted, the spoiler device controlling airflow when the spoiler device is deployed under predetermined operation conditions, and a controller configured to receive environmental information regarding a surrounding environment and to pre-store information regarding control of the spoiler device based on the environmental information including local information and weather information, the controller configured to perform control to deploy or retract the spoiler device based on information input to the controller when one of the local information and the weather information is input.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
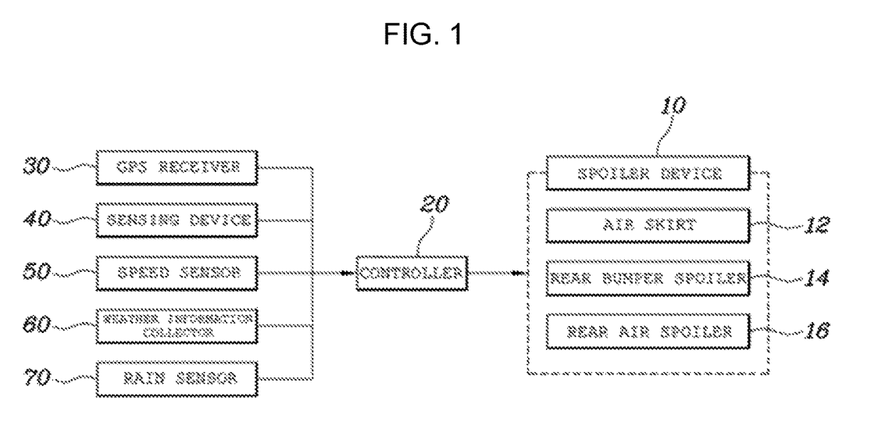
FIG. 1 is a view illustrating a configuration of a vehicular spoiler system that adjusts airflow based on environmental factors according to an exemplary embodiment of the present invention.
Figure 2:
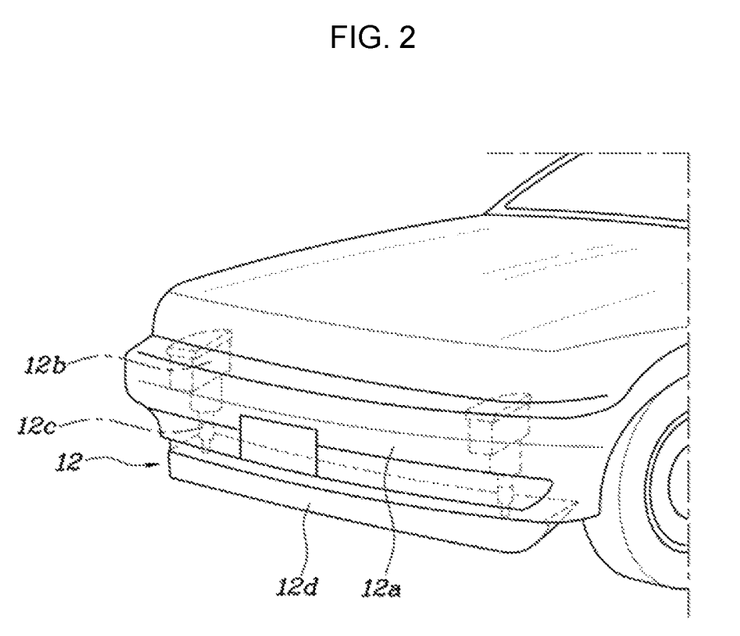
FIG. 2 is a view illustrating an air skirt of the vehicular spoiler system that adjusts airflow based on environmental factors illustrated in FIG. 1.
Figure 3:
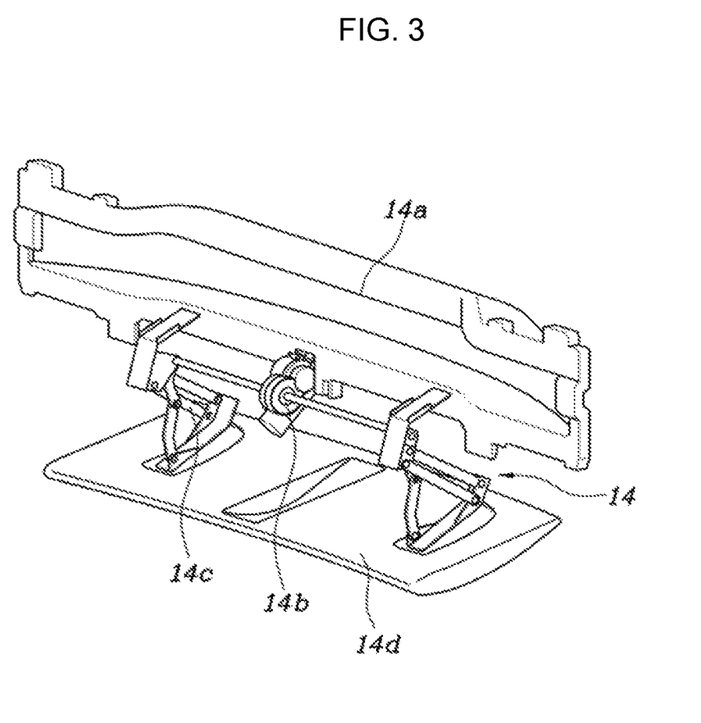
FIG. 3 is a view illustrating a rear bumper spoiler of the vehicular spoiler system that adjusts airflow based on environmental factors illustrated in FIG. 1.
Figure 4:
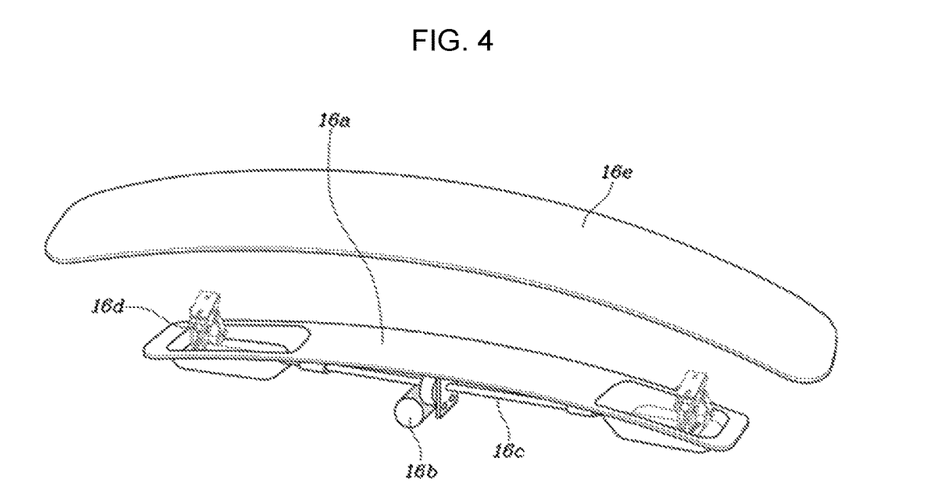
FIG. 4 is a view illustrating a rear air spoiler of the vehicular spoiler system that adjusts airflow based on environmental factors illustrated in FIG. 1.

FIG. 1 is a view illustrating the configuration of a vehicular spoiler system configured to adjusts airflow based on environmental factors according to an exemplary embodiment of the present invention, FIG. 2 is a view illustrating an air skirt of the vehicular spoiler system that adjusts airflow based on environmental factors illustrated in FIG. 1, FIG. 3 is a view illustrating a rear bumper spoiler of the vehicular spoiler system that adjusts airflow based on environmental factors illustrated in FIG. 1, and FIG. 4 is a view illustrating a rear air spoiler of the vehicular spoiler system that adjusts airflow based on environmental factors illustrated in FIG. 1.

The vehicular spoiler system that adjusts airflow based on environmental factors according to an exemplary embodiment of the present invention, as illustrated in FIG. 1, includes a spoiler device 10, which is disposed to the vehicle to vertically pivotably rotate to be deployed or retracted, the spoiler device 10 controlling an airflow when it is deployed under predetermined operation conditions, and a controller 20 configured to receive environmental information regarding the surrounding environment and pre-stores information regarding control of the spoiler device 10 based on the environmental information, the controller 20 performing control to deploy or retract the spoiler device 10 based on local information when the local information, among the environmental information, is input thereto.

Here, the spoiler device 10 may include one or more air skirts 12, which is disposed to the front lower portion of the vehicle to be vertically deployed or retracted, a rear bumper spoiler 14, which is disposed to the rear lower portion of the vehicle to be vertically deployed or retracted, and a rear air spoiler 16, which is disposed to the rear of the vehicle to be deployed or retracted. The air skirt 12, the rear bumper spoiler 14, and the rear air spoiler 16 may be individually operated, or may be simultaneously operated.

As described above, the spoiler device 10 may include the air skirt 12, the rear bumper spoiler 14, and the rear air spoiler 16, and only one thereof may be individually operated, or two or more thereof may be simultaneously operated, wherein optimal control depending on a plurality of situations may be performed. The spoiler device 10 may be deployed or retracted by motor control. Accordingly, with the motor control of the controller 20, the deployment or retraction of the air skirt 12, the rear bumper spoiler 14 and the rear air spoiler 16 may be performed.

Now, the spoiler device 10 will be schematically described. As illustrated in FIG. 2, in the case of the air skirt 12, a motor 12b and a piston 12c, which is vertically moved when the motor 12b operates, may be internally provided within a front bumper 12a, and a spoiler 12d may be disposed to the piston 12c. That is, as the piston 12c of the air skirt 12 is vertically moved when the motor 12b operates, the spoiler 12d connected to the piston 12c may be deployed or retracted. Here, the motor 12b may operate under the control of the controller 20, and the air skirt 12 is not limited to the above-described configuration, but may adopt any of various other configurations.

As illustrated in FIG. 3, in the case of the rear bumper spoiler 14, a motor 14b may be internally provided within a rear bumper 14a, a link mechanism 14c may be connected to the motor 14b to rotate when the motor 14b operates, and a spoiler 14d may be connected to the link mechanism 14c to be deployed or retracted when the link mechanism 14c rotates. Here, the motor 14b may operate under the control of the controller 20, and the rear bumper spoiler 14 is not limited to the above-described configuration, but may adopt any of various other configurations.

As illustrated in FIG. 4, the rear air spoiler 16 may be provided on a trunk side, and in the case of an SUV, may be provided on a tail of the vehicle. That is, in the case of the rear air spoiler 16, a motor 16b may be provided on a base 16a, which is fixed to the tail of the vehicle, a link mechanism 16d may be connected to a rotation shaft 16c, which extends from the motor 16b, and a spoiler 16e may be connected to the link mechanism 16d to be deployed or retracted in connection with the rotation of the link mechanism 16d when the motor 16b operates. Here, the motor 16b may operate under the control of the controller 20, and the rear air spoiler 16 is not limited to the above-described configuration, but may adopt any of various other configurations.

As described above, the air skirt 12, the rear bumper spoiler 14, and the rear air spoiler 16 may be configured to be deployed or retracted, and may be individually or simultaneously controlled under the control of the controller 20, to determine whether they are deployed or retracted.

In an exemplary embodiment of the present invention, the spoiler device 10 is deployed or retracted based on changes in a plurality of environmental factors including local information and weather information. Here, the local information may include, for example, road surface information, surrounding obstacle information, and a speed limit of a current road, and the weather information may include, for example, a wind speed, an amount of snowfall, and an amount of rainfall. Whether the spoiler device 10 is deployed or retracted may be determined based on the local information and the weather information, and the controller 20 may be configured to determine the position of the spoiler device 10 using one or both of the local information and the weather information.

Hereinafter, various exemplary embodiments of the present invention will be described in detail.

According to an exemplary embodiment of the present invention, the controller 20 may be configured to control the spoiler device 10 based on environmental information. When it is verified based on local information, among the environmental information, that an obstacle is present in a direction in which the vehicle is traveling, the controller 20 may perform control to prevent the spoiler device 10 from interfering with the obstacle, preventing damage to the spoiler device 10.

Exemplary embodiments in which the control of the spoiler device 10 is performed based on local information will be described below. The controller 20 may be configured to collect the local information by receiving GPS signals from a global positioning system (GPS) receiver 30, and may perform control to retract the air skirt 12 and the rear bumper spoiler 14 when it is determined that the vehicle is about to encounter a speed bump or is entering an inclined road.

Accordingly, the controller 20 may be configured to collect local information regarding an area in which the vehicle is currently traveling by receiving GPS signals from the GPS receiver 30, and may verify whether a speed bump or an inclined road is present on the road on which the vehicle is traveling based on the GPS signals. Here, when it is verified that the vehicle is about to encounter a speed bump or is entering an inclined road, the controller 20 may perform control to retract the air skirt 12 and the rear bumper spoiler 14. When the vehicle passes over the speed bump or enters the inclined road, the controller 20 may prevent the air skirt 12 and the rear bumper spoiler 14, which are provided on the lower portion of the vehicle, from being damaged due to contact with the speed bump or the inclined road.

In addition, the controller 20 may collect local information from a detecting device 40, which detects an obstacle around the vehicle, and may perform control to retract the air skirt 12 and the rear bumper spoiler 14 when the detecting device 40 inputs a signal indicating that an obstacle is present on the road surface in front of the vehicle.

Here, the detecting device 40 may be any device configured for detecting the presence of an object, including a radar device, an ultrasonic device, or a camera device. When the detecting device 40 detects an obstacle present on the road surface in front of the vehicle, the controller 20 may perform control to retract the air skirt 12 and the rear bumper spoiler 14, allowing the air skirt 12 and the rear spoiler 14 to avoid the obstacle present on the road surface, and consequently, preventing collision damage thereto.

The detecting device 40 may be configured to determine the presence or absence of an obstacle and the height of the obstacle. That is, the detecting device 40 may be a radar device, an ultrasonic device, or a camera device. When the detecting device 40 is an ultrasonic device, the detecting device 40 may emit horizontal ultrasonic waves, and thereafter may determine the height of an obstacle by detecting the reflected ultrasonic waves. When the detecting device 40 is a camera device, the detecting device 40 may derive a distance to an obstacle and the height of the obstacle by comparing images captured by a horizontal camera and a tilted camera. The method of detecting the object and measuring the height of the object ultrasonically or using the cameras is a common technology, and a detailed description thereof will be omitted.

Information regarding the height of the obstacle detected by the detecting device 40 may be transmitted to the controller 20, and the controller 20 may perform control to retract the air skirt 12 and the rear bumper spoiler 14 when the height of the obstacle input from the detecting device 40 is a predetermined height or greater. Here, the predetermined height, which is stored in the controller 20, may be the height of the air skirt 12 and the rear bumper spoiler 14 from the road surface in the state in which the air skirt 12 and the rear bumper spoiler 14 are deployed.

That is, when the controller 20 performs control to retract the air skirt 12 and the rear bumper spoiler 14 when verified by the detecting device 40 that an obstacle is present in front of the vehicle, excessive power consumption and deterioration in traveling performance may occur. The controller 20 may compare the height of the obstacle detected by the detecting device 40 with the predetermined height, and may perform control to retract the air skirt 12 and the rear bumper spoiler 14 when the height of the obstacle is the predetermined height or greater, maintaining a traveling performance and ensuring durability by avoiding obstacles.

In addition, the controller 20 may collect vehicle speed information from a speed detector 50, and may allow the air skirt 12 and the rear bumper spoiler 14 to be deployed or retracted by a driver's command when the vehicle speed is within a predetermined low-speed range in the state in which the obstacle is detected by the detecting device 40. Here, the predetermined low-speed range, which is stored in the controller 20, may range from 0 km/h to 60 km/h, but the predetermined range may be changed to a plurality of values depending on the specifications of the vehicle and the low-speed traveling conditions of the vehicle.

That is, when the vehicle speed measured by the speed detector 50 is within the predetermined low-speed range, the controller 20 may allow the air skirt 12 and the rear bumper spoiler 14 to be deployed or retracted only by driver manipulation. For example, when the vehicle travels at a low speed of approximately 15 km/h, even when an obstacle including a speed bump is present in front of the vehicle, the air skirt 12 and the rear bumper spoiler 14 may smoothly pass over the obstacle without collision with the obstacle. When the controller 20 performs control to retract the air skirt 12 and the rear bumper spoiler 14 even in the present situation, unnecessary power loss may occur and the driver may feel uncomfortable due to frequent operations of the air skirt 12 and the rear bumper spoiler 14.

Therefore, when the vehicle speed is within the low-speed range, the controller 20 may not perform control of the air skirt 12 and the rear bumper spoiler 14, but may allow the air skirt 12 and the rear bumper spoiler 14 to be retracted or deployed by an operation that reflects the driver's command, preventing unnecessary operation of the spoiler device 10.

Here, the operation that reflects the driver's command is a driver manipulation of a specific switch to control the deployment or retraction of the spoiler device 10. That is, when the driver does not directly operate the spoiler device 10, the spoiler device 10 may maintain a conventional operating state under predetermined operation conditions, but may be operated to satisfy the driver manipulation when the driver directly operates the spoiler device 10.

As described above, the air skirt 12 and the rear bumper spoiler 14 of the spoiler device 10 may be deployed or retracted in consideration of the position of the obstacle, which is verified based on local information including GPS signals from the GPS receiver 30, the height of the obstacle detected by the detecting device 40, and the traveling speed of the vehicle detected by the speed detector 50, wherein the spoiler device 10 may maintain its durability by avoiding obstacles.

In addition, the controller 20 may receive information regarding the speed limit of the current road based on the GPS signals, and may perform control to operate the spoiler device 10 under predetermined operation conditions when it is determined that the speed limit of the current road is within a predetermined high-speed range.

Here, the predetermined high-speed range may be 60 km/h or greater, but the predetermined range may be changed to a plurality of values depending on the specifications of the vehicle and the road conditions. Usually, the spoiler device 10 may be deployed to secure traveling performance when the vehicle travels at a high speed.

The controller 20 may be configured to verify the speed limit of the current road based on GPS signals, and when it is verified that the speed limit of the current road is within a high-speed range, the controller 20 may perform control to deploy each of the air skirt 12, the rear bumper spoiler 14 and the rear air spoiler 16 of the spoiler device 10, or may perform control to deploy only a specific element of the spoiler device 10 to achieve an optimal aerodynamic performance.

On the other hand, when it is determined that the speed limit of the current road is within a predetermined low-speed range, the controller 20 may perform control to retract the spoiler device 10 wherein the air skirt 12, the rear bumper spoiler 14, and the rear area spoiler 16 are deployed by the driver's commands. Here, the predetermined low-speed range, which is stored in the controller 20, may be 60 km/h or less, but the predetermined range may be changed to a plurality of values depending on the specifications of the vehicle and the road conditions.

When the spoiler device 10 is operated while the vehicle travels at a low speed, the present case may result in deterioration in aerodynamic performance. The spoiler device 10 normally remains in the retracted state so that the air skirt 12, the rear bumper spoiler 14 and the rear air spoiler 16, which form the spoiler device 10, are operated by the driver's command. That is, because the driver may command to deploy the spoiler device 10 in consideration of an external appearance thereof, even when the vehicle travels at a low speed, the spoiler device 10 may be operated by an operation that reflects the driver's commands.

Meanwhile, exemplary embodiments in which the control of the spoiler device 10 is performed based on weather information will be described. The vehicular spoiler system includes the spoiler device 10, which is disposed to the vehicle to vertically pivotably rotate to be deployed or retracted, the spoiler device 10 controlling airflow when it is deployed under predetermined operation conditions, and the controller 20, configured to receive environmental information regarding the surrounding environment and pre-stores information regarding control of the spoiler device 10 based on the environmental information, the controller 20 performing control to deploy or retract the spoiler device 10 based on weather information when the weather information, among the environmental information, is input thereto.

Here, the spoiler device 10 may include one or more air skirts 12, which is disposed to the front lower portion of the vehicle to be vertically deployed or retracted, the rear bumper spoiler 14, which is disposed to the rear lower portion of the vehicle to be vertically deployed or retracted, and the rear air spoiler 16, which is disposed to the rear of the vehicle to be deployed or retracted, and the air skirt 12, the rear bumper spoiler 14 and the rear air spoiler 16 may be individually operated, or may be simultaneously operated.

That is, the controller 20 may perform control to deploy or retract the spoiler device 10 to improve the aerodynamic performance when it is determined based on the weather information, among the environmental information, that the vehicle may be affected by a weather condition.

Here, the weather information input to the controller 20 may be the wind speed, and the controller 20 may perform control to retract the spoiler device 10 when the input wind speed is a reference wind speed or greater, preventing deterioration in traveling performance due to the influence of the wind speed against the spoiler device 10.

The controller 20 may collect wind speed information by receiving the weather information from a weather information collector 60, and may perform control to operate the spoiler device 10 under predetermined operation conditions when the wind speed is less than a predetermined reference wind speed. Here, the predetermined reference wind speed, which is stored in the controller 20, may be a wind speed value at which the traveling performance deteriorates by the wind speed in the state in which the spoiler device 10 is deployed, and for example, the reference wind speed may be 14 m/s or less.

The weather information collector 60 may receive weather information from a national weather service, and the controller 20 may be configured to compare the wind speed of the area in which the vehicle is currently traveling with the predetermined reference wind speed when receiving the weather information from the weather information collector 60, and may perform control to operate the spoiler device 10 under predetermined operation conditions based on the traveling situation when the wind speed is less than the reference wind speed. Accordingly, the airflow may be controlled to improve traveling performance by the air skirt 12, the rear bumper spoiler 14 and the rear air spoiler 16, which form the spoiler device 10.

In addition, the controller 20 may be configured to collect vehicle speed information from the speed detector 50, and may perform control to deploy only the air skirt 12 when the vehicle speed is a predetermined speed or greater and the wind speed is within a predetermined wind speed range.

Here, the predetermined vehicle speed may be 90 km/h, and the predetermined wind speed range may range from 10 m/s to 14 m/s, but the predetermined vehicle speed and the predetermined wind speed range may be changed to a plurality of values depending on the specifications of the vehicle.

When the spoiler device 10 is deployed when the vehicle travels at the predetermined speed or greater and the wind speed of the surrounding environment is within the predetermined wind speed range, so-called traveling wind, depending on the vehicle travel speed, as well as natural wind around the vehicle may have a negative effect on vehicle posture control. That is, because the rear bumper spoiler 14 and the rear air spoiler 16 are greatly affected by lateral wind from a lateral side of the vehicle or headwind, the operation of the rear bumper spoiler 14 and the rear air spoiler 16 may be limited to stably maintain vehicle posture control, and only the air skirt 12, which is less affected by the lateral wind or the headwind, may be operated.

Accordingly, the vehicle may stably maintain the posture thereof even when it is affected by the wind during traveling.

In addition, the controller 20 may be configured to collect information regarding the amount of snowfall by receiving the weather information from the weather information collector 60, and may perform control to retract the spoiler device 10 when the amount of snowfall is a predetermined reference amount of snowfall or greater.

That is, the controller 20 performs control to deploy or retract the spoiler device 10 in consideration of the amount of snowfall, among the weather information. Here, the controller 20 may perform control to retract the spoiler device 10 when the input amount of snowfall is the predetermined reference amount of snowfall or greater, preventing damage to or soiling of the spoiler device 10 due to the large amount of snowfall, and preventing deterioration in traveling performance due to snowfall.

In addition, when the amount of snowfall is less than the predetermined reference amount of snowfall, the controller 20 may perform control to operate the spoiler device 10 under predetermined operation conditions. Here, the predetermined reference amount of snowfall, which is stored in the controller 20, may be determined based on whether or not smooth traveling is possible under the current amount of snowfall. That is, when the amount of snowfall is less than the reference amount of snowfall, the snow on the road surface may have no effect on the spoiler device 10, and thus the spoiler device 10 may be operated under predetermined operation conditions, increasing aerodynamic performance.

Accordingly, the controller 20 may perform control to operate the spoiler device 10 under predetermined operation conditions when the amount of snowfall is less than the reference amount of snowfall, but may change the operation conditions of the spoiler device 10 based on the amount of snowfall.

That is, the controller 20 may determine a range of the amount of snowfall less than the reference amount of snowfall to a general snowfall range, which corresponds to a small amount of snowfall, and a heavy snowfall warning range, which corresponds to a larger amount of snowfall than the general snowfall range. Here, the general snowfall range and the heavy snowfall warning range are divided based on the amount of snowfall per hour.

In the case of the general snowfall range, the amount of snowfall per hour has no substantial effect on the vehicle travel, and thus the spoiler device 10 is operated under predetermined operation conditions to ensure vehicle travel with improved aerodynamic performance.

In the case of the heavy snowfall warning range, the amount of snowfall per hour has an effect on vehicle travel, and thus damage to or soiling of the spoiler device 10 may occur upon vehicle travel in the state in which the spoiler device 10 is deployed. The controller 20 may perform control to retract only the rear air spoiler 16 when the amount of snowfall is within the heavy snowfall warning range below the reference amount of snowfall. That is, when there is a lot of snow, the rear air spoiler 16 may be retracted because the snow accumulates on the deployed rear air spoiler 16 as well as on the vehicle trunk, which causes deterioration in aerodynamic performance and soiling of the deployed rear air spoiler 16.

In addition, the controller 20 may be configured to collect information regarding the amount of rainfall from a rain detector 70, and may perform control to retract the spoiler device 10 when the amount of rainfall is a predetermined reference amount of rainfall or greater.

That is, the controller 20 may perform control to deploy or retract the spoiler device 10 in consideration of the amount of rainfall, among the weather information. Here, the weather information input to the controller 20 is the amount of rainfall, and when the amount of rainfall input to the controller 20 is the reference amount of rainfall or greater, the controller 20 performs control to retract the spoiler device 10s to reduce the effect of the large amount of rainfall.

When the amount of rainfall is the reference amount of rainfall or greater, the operation conditions of the spoiler device 10 may be changed based on the amount of rainfall.

Accordingly, the controller 20 may determine a range of the amount of rainfall greater than the reference amount of rainfall to be a medium rainfall range and a strong rainfall range, which corresponds to a larger amount of rainfall than the medium rainfall range, and collects vehicle speed information from the speed detector 50. Here, the medium rainfall range, the strong rainfall range, and the vehicle speed range may be determined in the controller 20 in consideration of the effects on the spoiler device 10 and vehicle posture control based on the relationship between the amount of rainfall and the vehicle travel speed.

When the amount of rainfall is within the medium rainfall range and the vehicle speed is within a predetermined speed range, the controller 20 may perform control to deploy only the rear air spoiler 16.

That is, because the air skirt 12 and the rear bumper spoiler 14 may be soiled by rainwater falling on the road surface when the amount of rainfall is within the medium rainfall range and the vehicle is traveling within the predetermined speed range, the controller 20 may perform control to retract the air skirt 12 and the rear bumper spoiler 14 and deploy the rear air spoiler 16, which may ensure traveling with improved aerodynamic performance.

Meanwhile, the controller 20 performs control to retract the spoiler device 10 when the amount of rainfall is within the strong rainfall range because traveling stability is remarkably reduced due to the large amount of rainfall, whereby high-speed travel becomes difficult. In addition, because the spoiler device 10 may be damaged when it is deployed under the condition in which there is a lot of rainfall, the spoiler device 10 may be completely retracted.

On the other hand, when the amount of rainfall is less than the reference amount of rainfall, the controller 20 may perform control to operate the spoiler device 10 under predetermined operation conditions. That is, because high-speed traveling of the vehicle is possible when the amount of rainfall is less than the reference amount of rainfall, the controller 20 may perform control to operate the spoiler device 10 under predetermined operation conditions based on the vehicle travel speed, which may ensure high traveling performance.

Meanwhile, the vehicular spoiler system that adjusts airflow based on environmental factors according to an exemplary embodiment of the present invention may include the spoiler device 10, which is disposed to the vehicle to vertically pivotably rotate to be deployed or retracted, the spoiler device 10 controlling airflow when it is deployed under predetermined operation conditions, and the controller 20, which receives environmental information regarding the surrounding environment, which includes local information and weather information, and pre-stores information regarding the control of the spoiler device 10 based on the environmental information, the controller 20 performing control to deploy or retract the spoiler device 10 based on information input thereto when any one of the local information and the weather information is input.

That is, the controller 20 performs control of the spoiler device 10 by collecting the environmental information including local information and weather information. The local information may be, for example, road surface information, surrounding obstacle information, and the speed limit of the road on which the vehicle is currently traveling, and the weather information may be, for example, the wind speed, the amount of snowfall, and the amount of rainfall.

Accordingly, the controller 20 may is configured to collect both the local information and the weather information, and may perform control of the spoiler device 10 based on various pieces of information including, for example, road surface information, surrounding obstacle information, the speed limit of the road on which the vehicle is currently traveling, the wind speed, the amount of snowfall, and the amount of rainfall, to secure an increased aerodynamic performance and the durability of the air spoiler device 10.

As is apparent from the above description, according to a vehicular spoiler system that adjusts airflow based on environmental factors having the above-described configuration, the deployment or retraction of a spoiler device is determined based on changes in a plurality of environmental factors including local information, weather information, and the presence or absence of obstacles.

It is possible to prevent the spoiler device from being damaged due to obstacles during traveling, which may secure the durability of the spoiler device. In addition, the deployment or retraction of the spoiler device is configured to be adjusted in consideration of the amount of rainfall, the amount of snowfall, and the airflow conditions, which enables an efficient airflow control.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enables others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicular spoiler system that adjusts airflow based on environmental factors, the system comprising:
    a spoiler device disposed to a vehicle to vertically pivotably rotate to be deployed or retracted, the spoiler device controlling the airflow when the spoiler device is deployed under predetermined operation conditions; and
    a controller configured to receive environmental information regarding a surrounding environment and to pre-store information regarding control of the spoiler device based on the environmental information, the controller performing control to deploy or retract the spoiler device based on local information when the local information, among the environmental information, is input,
    wherein the spoiler device includes one or more air skirts disposed to a front lower portion of the vehicle to be vertically deployed or retracted, a rear bumper spoiler disposed to a rear lower portion of the vehicle to be vertically deployed or retracted, and a rear air spoiler disposed to a rear of the vehicle to be vertically deployed or retracted, and the one more air skirts, the rear bumper spoiler and the rear air spoiler are individually or simultaneously operated,
    wherein the controller is configured to determine whether an obstacle is present on a road surface upon receiving the local information, and when the controller is configured to determine that the obstacle is present on the road surface, the controller performs the control to deploy or retract the spoiler device to prevent the spoiler device from interfering with the obstacle,
    wherein the controller is configured to collect the local information a detecting device, which detects the obstacle around the vehicle, and performs control to retract the one or more air skirts and the rear bumper spoiler when the detecting device inputs a signal indicating that the obstacle is present on the road surface in a front of the vehicle,
    wherein the detecting device determines presence or absence of the obstacle and a height of the obstacle, and
    wherein the controller is configured to collect information regarding the height of the obstacle from the detecting device, and performs control to retract the one or more air skirts and the rear bumper spoiler when the height of the obstacle is a predetermined height or greater than the predetermined height.

2. The system according to claim 1, wherein the controller is configured to collect the local information by receiving a GPS signal from a global positioning system (GPS) receiver, and performs control to retract the one or more air skirts and the rear bumper spoiler when the controller is configured to determine that the vehicle is about to encounter a speed bump or is entering an inclined road.

3. The system according to claim 1, wherein the controller is configured to collect vehicle speed information from a speed detector, and allows the one or more air skirts and the rear bumper spoiler to be deployed or retracted by a driver's commands when a vehicle speed is within a predetermined low speed range when the obstacle is detected by the detecting device.

4. The system according to claim 1, wherein the controller is configured to receive the local information regarding a speed limit of a current road based on GPS signals, and when the controller is configured to determine that the speed limit of the current road is within a high speed range, the controller performs control to operate the spoiler device under the predetermined operation conditions.

5. The system according to claim 4, wherein the controller is configured to perform control to retract the spoiler device and to allow the one or more air skirts, the rear bumper spoiler and the rear air spoiler to be deployed by a driver's commands when the controller is configured to determine that the speed limit of the current road is within a low speed range, which is lower than the high speed range.

6. A vehicular spoiler system that adjusts airflow based on environmental factors, the system comprising:
    a spoiler device disposed to a vehicle to vertically pivotably rotate to be deployed or retracted, the spoiler device controlling the airflow when the spoiler device is deployed under predetermined operation conditions; and
    a controller configured to receive environmental information regarding a surrounding environment and to pre-store information regarding a control of the spoiler device based on the environmental information, the controller performing control to deploy or retract the spoiler device based on weather information regarding a weather condition when the weather information, among the environmental information, is input,
    wherein the spoiler device includes one or more air skirts disposed to a front lower portion of the vehicle to be vertically deployed or retracted, a rear bumper spoiler disposed to a rear lower portion of the vehicle to be vertically deployed or retracted, and a rear air spoiler disposed to a rear of the vehicle to be vertically deployed or retracted, and the one or more air skirts, the rear bumper spoiler and the mar air spoiler are individually or simultaneously operated,
    wherein the controller is configured to collect wind speed information by receiving the weather information from a weather information collector, and performs control to retract the spoiler device when a wind speed is a reference wind speed or greater than the reference wind speed, and wherein the controller is configured to collect vehicle speed information from a speed detector, and performs control to deploy only the one or more air skirts when a vehicle speed is a predetermined speed or greater than the predetermined speed and the wind speed is within a predetermined wind speed range.

7. The system according to claim 6, wherein the controller is configured to perform control to operate the spoiler device under the predetermined operation conditions when the wind speed is less than the reference wind speed.

8. The system according to claim 6, wherein the controller is configured to collect information regarding an amount of snowfall by receiving the weather information from the weather information collector, and performs control to retract the spoiler device when the amount of snowfall is a reference amount of snowfall or greater than the reference amount of snowfall.

9. The system according to claim 8, wherein the controller is configured to perform control to operate the spoiler device under the predetermined operation conditions when the amount of snowfall is less than the reference amount of snowfall.

10. The system according to claim 8, wherein the controller is configured to determine a range of the amount of snowfall less than the reference amount of snowfall to be a general snowfall range, which corresponds to a small amount of snowfall, and a heavy snowfall warning range, which corresponds to a larger amount of snowfall than the general snowfall range, and
wherein the controller performs control to operate the spoiler device under the predetermined operation conditions when the amount of snowfall is within the general snowfall range.

11. The system according to claim 10, wherein the controller is configured to perform control to retract only the rear air spoiler when the amount of snowfall is within the heavy snowfall range and less than the reference amount of snowfall.

12. The system according to claim 6, wherein the controller is configured to collect information regarding an amount of rainfall from a rain detector, and performs control to retract the spoiler device when the amount of rainfall is a reference amount of rainfall or greater than the reference amount of rainfall.

13. The system according to claim 12, wherein the controller is configured to perform control to operate the spoiler device under the predetermined operation conditions when the amount of rainfall is less than the reference amount of rainfall.

14. The system according to claim 12, wherein the controller is configured to determine a range of the amount of rainfall greater than the reference amount of rainfall to be a medium rainfall range and a strong rainfall range, which corresponds to a larger amount of rainfall than the medium rainfall range, collects the vehicle speed information from the speed detector, and performs control to deploy only the rear air spoiler when the vehicle speed is within a predetermined speed range when the amount of rainfall is within the medium rainfall range.

15. The system according to claim 14, wherein the controller is configured to perform control to retract the spoiler device when the amount of rainfall is within the strong rainfall range.

16. A vehicular spoiler system that adjusts an airflow based on environmental factors, the system comprising:
a spoiler device disposed to a vehicle to vertically pivotably rotate to be deployed or retracted, the spoiler device controlling the airflow when the spoiler device is deployed under predetermined operation conditions; and
a controller configured to receive environmental information regarding a surrounding environment and to pre-store information regarding control of the spoiler device based on the environmental information including local information and weather information, the controller performing control to deploy or retract the spoiler device based on information input to the controller when one of the local information and the weather information is input,
wherein the spoiler device includes one or more air skirts disposed to a front lower portion of the vehicle to be vertically deployed or retracted, a rear bumper spoiler disposed to a rear lower portion of the vehicle to be vertically deployed or retracted, and a rear air spoiler disposed to a rear of the vehicle to be vertically deployed or retracted, and the one or more air skirts, the rear bumper spoiler and the rear air spoiler are individually or simultaneously operated,
wherein the controller is configured to determine whether obstacle is present on a road surface upon receiving the local information, and when the controller is configured to determine that the obstacle is present on the road surface, the controller performs the control to deploy or retract the spoiler devise to prevent the spoiler device from interfering with the obstacle,
wherein the controller is configured to collect the local information from a detecting device, which detects the obstacle around the vehicle, and performs control to retract the one or more air skirts and the rear bumper spoiler when the detecting device inputs a signal indicating that the obstacle is present on the road surface in a front of the vehicle,
wherein the detecting device determines presence of absence of the obstacle and a height of the obstacle, and
wherein the controller is configured to collect information regarding the height of the obstacle from the detecting device, and performs control to retract the one or more air skirts and the rear bumper spoiler when the height of the obstacle is a predetermined height or greater than the predetermined height.

* * * * *